(12) United States Patent
Sawada

(10) Patent No.: US 7,523,084 B2
(45) Date of Patent: Apr. 21, 2009

(54) ACTION EVALUATION APPARATUS AND METHOD

(75) Inventor: Tsutomu Sawada, Tokyo (JP)

(73) Assignee: Sony Coporation, Tokyo (JP)

( * ) Notice: Subject to any disclaimer, the term of this patent is extended or adjusted under 35 U.S.C. 154(b) by 294 days.

(21) Appl. No.: 11/472,036

(22) Filed: Jun. 21, 2006

(65) Prior Publication Data

US 2006/0293900 A1    Dec. 28, 2006

(30) Foreign Application Priority Data

Jun. 22, 2005    (JP)    ............................. 2005-182514

(51) Int. Cl.
G06N 5/00    (2006.01)
(52) U.S. Cl. ......................................... 706/52; 706/45
(58) Field of Classification Search .................. 706/52, 706/45
See application file for complete search history.

(56) References Cited

U.S. PATENT DOCUMENTS

| | | | | |
|---|---|---|---|---|
| 6,233,570 | B1* | 5/2001 | Horvitz et al. | 706/11 |
| 6,570,555 | B1* | 5/2003 | Prevost et al. | 345/156 |
| 6,720,949 | B1* | 4/2004 | Pryor et al. | 345/158 |
| 7,187,790 | B2* | 3/2007 | Sabol et al. | 382/128 |
| 7,264,554 | B2* | 9/2007 | Bentley | 473/222 |
| 2004/0234938 | A1* | 11/2004 | Woolf et al. | 434/353 |

OTHER PUBLICATIONS http://web.archive.org/web/20050308023047/http://www.playstation.jp/and/soft/pickup/eyetoy_play.html, date unknown.
http://www.jp.playstation.com/scej/title/operatorsside/01.html, date unknown.
Real-time Multi-view Face Detection using Pixel Difference Feature, Kohtaro Sabe, Ken'ichi Hidai 10th Symposium on Sensing via Image Information, pp. 547-552, 2004.
"Emotion Recognition Using Face Image and Speech Information for Robots", Shohei Matsumoto, Takeshi Yamaguchi, Kazunori Komatani, Tetsuya Ogata, Hiroshi G Okuno The 22nd Annual Conference of the Robotics Society of Japan, 3D14, 2004.
"Hand Gesture recognition using Multi-Scale Colour Features, Hierarchical Models and Particle Filtering", Lars Bretzner, Ivan laptev and Tony Lindberg Fifth IEEE International Conference on Automatic Face and Gesture Recognition, pp. 405-410, 2002.

* cited by examiner

Primary Examiner—Wilbert L Starks, Jr.
(74) Attorney, Agent, or Firm—Frommer Lawrence & Haug LLP; William S. Frommer; Thomas F. Presson

(57) ABSTRACT

An action evaluation apparatus evaluates a user's action corresponding to an action desired by a system, and determines the ongoing of a story using the evaluation result. The action evaluation apparatus includes a recognizer for recognizing the user's action through a plurality of modals, and an action evaluator for evaluating the user's action based on the recognition result of the respective modals obtained by the recognizer.

7 Claims, 5 Drawing Sheets

ACTION EVALUATION APPARATUS AND METHOD

CROSS REFERENCES TO RELATED APPLICATIONS

The present invention contains subject matter related to Japanese Patent Application JP 2005-182514 filed in the Japanese Patent Office on Jun. 22, 2005, the entire contents of which being incorporated herein by reference.

BACKGROUND OF THE INVENTION

1. Field of the Invention

The present invention relates to an action evaluation apparatus and method for evaluating a user's action corresponding to an action desired by a system.

2. Description of Related Art

Recently, game apparatuses which activate various application software are sold, and the majority of them employ general-purpose controllers such as joysticks and game pads, controlling games with simplified modals such as a button and stick etc.

On the other hand, there exists a game apparatus that has a camera, and controls a game by using input images thereof (for instance, Eye Toy(™): Play by SONY COMPUTER ENTERTAINMENT Corp. disclosed in a non-patent document 1: http://www.playstation.jp/land/soft/pickup/eyetoy_play.html), and another game apparatus that has a microphone, and controls a game by using input speeches thereof (for instance, OPERATORS SIDE by SONY COMPUTER ENTERTAINMENT Corp. disclosed in a non-patent document 2: http://www.playstation.jp/scej/title/operatorsside/0.1.html). These apparatuses employ a single modal such as a movable range within an image, text that is of speech content to control games.

SUMMARY OF THE INVENTION

The game apparatus controlling a game by using a single modal can provide a user with only simple content games. However, it is difficult for the game apparatus to provide a game that has a complicated structure, in which a user performs actions and the story is made to go on using evaluations of the actions.

This invention is proposed in view of above-described circumstances, and it is desirable to provide an action evaluation apparatus and method that evaluate a user's action corresponding to an action desired by a system, and provide the evaluation result.

According to an embodiment of the present invention, there is provided an action evaluation apparatus for evaluating a user's action, including a recognition means for recognizing the user's action through a plurality of modals, and an action evaluation means for evaluating the user's action based on the recognition result of the respective modals obtained by the recognition means.

According to an embodiment of the present invention, there is provided an action evaluation method for evaluating a user's action, including the steps of recognizing the user's action through a plurality of modals, and evaluating the user's action based on the recognition result of the respective modals obtained in the recognition step.

According to the action evaluation apparatus and method of the present invention, a user's action can be recognized through a plurality of modals. The invention also makes it possible to evaluate the user's action based on the recognition result of the respective modals.

DESCRIPTION OF THE PREFERRED EMBODIMENTS

Figure 1:
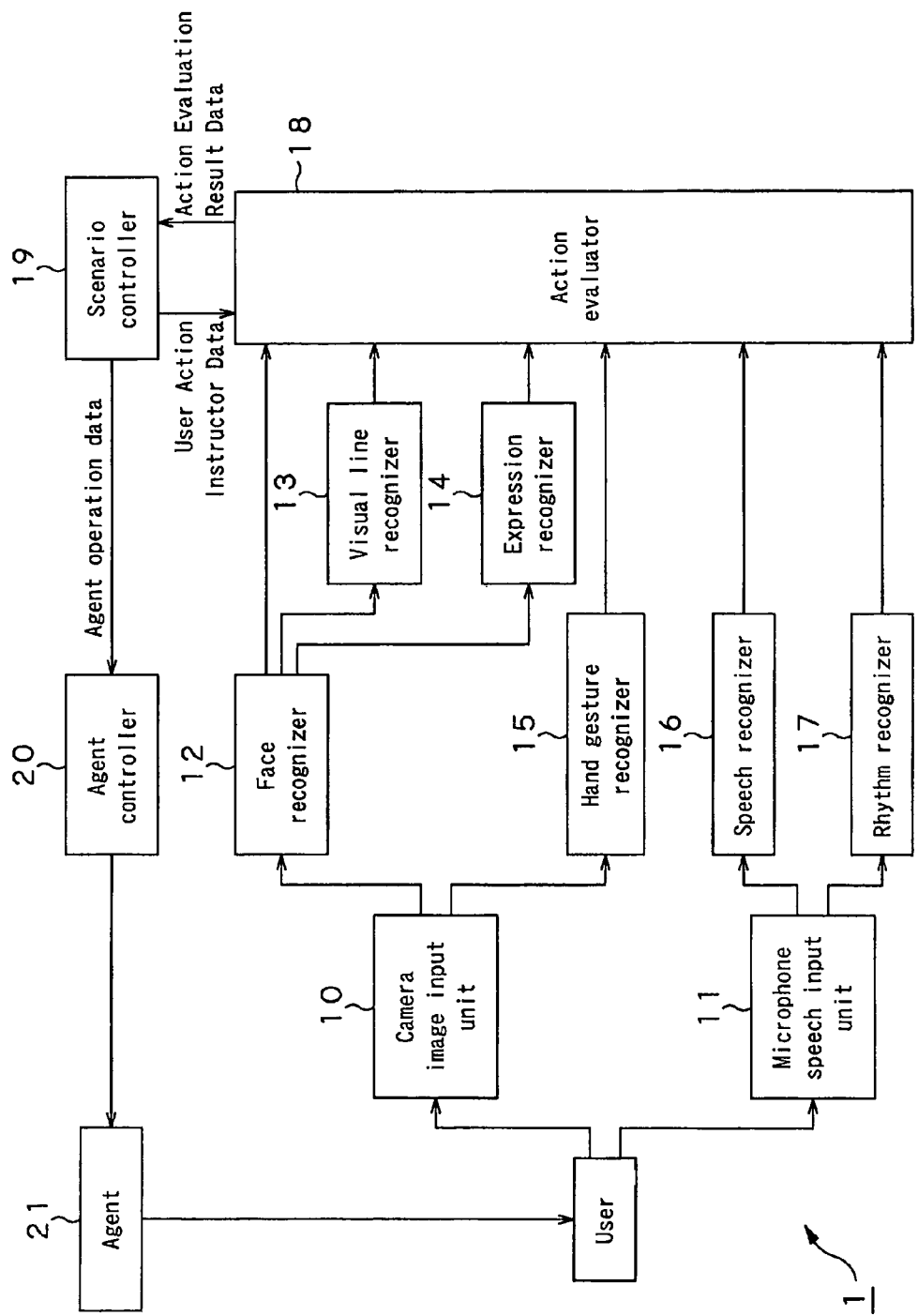
FIG. 1 shows a block diagram showing a schematic configuration of an action evaluation apparatus according to an embodiment of the present invention.

Referring to the drawings, the embodiment of the present invention is described in detail.

First, the configuration of an action evaluation apparatus in the illustrative embodiment is shown.

As is shown in FIG. 1, an action evaluation apparatus 1 according to an embodiment of the present invention includes a camera image input unit 10, a microphone speech input unit 11, a face recognizer 12, a visual line recognizer 13, an expression recognizer 14, a hand gesture recognizer 15, a speech recognizer 16, a rhythm recognizer 17, an action evaluator 18, a scenario controller 19, an agent controller 20, and an agent 21.

The camera image input unit 10 receives images of a user who does actions, and then provides the input images to the face recognizer 12 and to the hand gesture recognizer 15.

The microphone speech input unit 11 receives speeches of the user who does actions, and then provides the input speeches to the speech recognizer 16 and to the rhythm recognizer 17.

The face recognizer 12 recognizes a face image when images are provided from the camera image input unit 10. Then, the face recognizer 12 detects the face center position (x, y) on an orthogonal coordinate plane, where the horizontal direction is X axis and the vertical direction is Y axis, using the provided image. And the direction of the face is detected at that position, and the detected face direction is expressed using roll, pitch, and yow angles. After that, the face recognizer 12 provides the action evaluator 18 with data $F(t)\{x(t), y(t), roll(t), pitch(t), yow(t)\}$, which indicates the center position and direction of the face within the image at the time "t". Also the face recognizer 12 provides the face image to the visual line recognizer 13 and to the expression recognizer 14. Meanwhile, the technology to detect a face is, disclosed, for instance, in "Learning of an actual time arbitrary posture detector using pixel difference feature" (Kotaro Sabe, Kenichi Hidai)

(http://face.pdp.crl.sony.co.jp/index.html#mview_face_detection).

The visual line recognizer 13 detects a visual line direction of the right eye and a visual line direction of the left eye using the face image when the face image is provided from the face recognizer 12. Then, the visual line recognizer 13 expresses the detected visual line direction of the right eye ($\theta r$, $\Phi r$) and the detected visual line direction of the left eye ($\theta l$, $\Phi l$) using a three dimensional spherical coordinate. After that, the visual line recognizer 13 provides the action evaluator 18 with data $G(t)\{\theta r(t), \Phi r(t), \theta l(t), \Phi l(t)\}$, which indicates the visual line direction at the time "t". The technology to detect the visual line direction using a predetermined coordinate system based on a face image is disclosed in the Japanese Patent Laid-Open Publication H3-51407.

Figure 2:
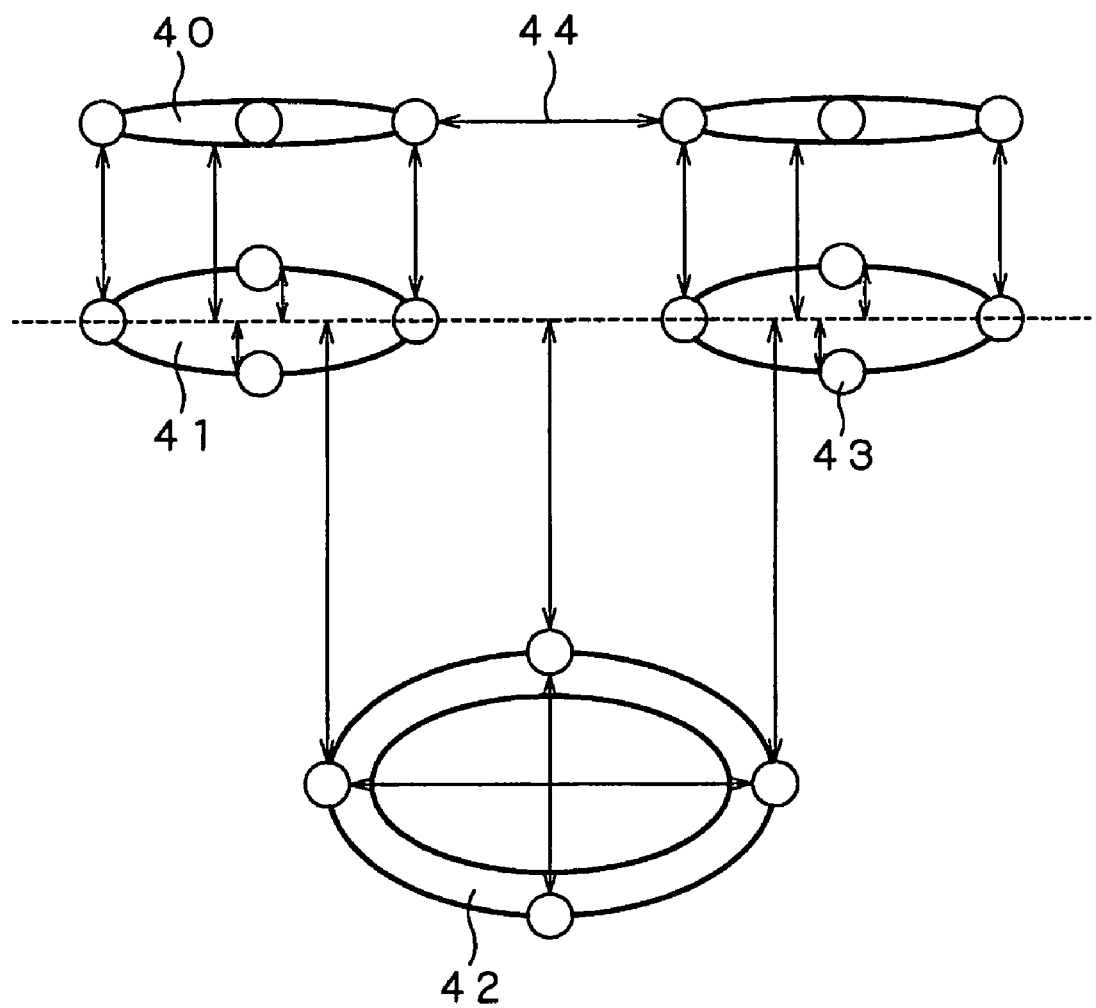
FIG. 2 shows a diagram showing feature points and inter-feature-point distances of expression detected by an expression recognizer according to an embodiment of the present invention.

When the face image is provided from the face recognizer 12, the expression recognizer 14 detects 18 feature points 43 located on eyebrows 40, eyes 41, and a mouth 42, using the face image, as shown in FIG. 2. Next, the expression recognizer 14 calculates inter-feature-point distances 44 which are represented by 16 arrows located around the eyebrows 40, eyes 41, and mouth 42 in order to identify the user's facial expression. After that, the expression recognizer 14 provides the action evaluator 18 with data $E(t)\{Ei(t)\}(i=0 \text{ to } 15)$ which indicates the inter-feature-point distances 44 at the time "t". Here, the technology to recognize expressions using inter-feature-point distances is disclosed in "Emotion recognition by integrating face image information and speech information with the purpose of robot utilization, Japanese Robot Institute 22$^{nd}$ convention, 3D14, September 2004 (Shouhei Matsumoto, Ken Yamaguchi, Kazunori Komatani, Tetsuya Ogata, Hiroshi Okuno)" (http://winnie.kuis.kyoto-u.ac.jp/okuno-lab-bib-j.html)

When the image is provided from the camera image input unit 10, the hand gesture recognizer 15 detects the hand center position (x, y) on an orthogonal coordinate plane, where the horizontal direction is X axis and the vertical direction is Y axis, using the image. The recognizer 15 also detects a rotation angle, with an axis transmitting through the position (x, y) and being perpendicular to the palm of the hand set to the rotation axis, as a hand direction "α", and further detects a hand size "s" and a finger status "1" (for instance, the number of standing fingers of five fingers). This will enable the hand gesture recognizer 15 to identify the status of hand gesture performed by the user. After that, the hand gesture recognizer 15 provides the action evaluator 18 with data $H(t)\{x(t), y(t), s(t), \alpha(t), 1(t)\}$ which indicates the hand gesture status at the time "t". The technology to recognize hand gestures is disclosed in "Lars Bretzner, Ivan laptev and Tony Lindberg. Hand Gesture recognition using Multi-Scale Colour Features, Hierarchical Models and Particle Filtering.

(http://cg.cs.uni-bonn.de/docs/teaching/2003/SS/cv-seminar/documents/papers/bret zner02hand.pdt)

When a speech is provided from the microphone speech input unit 11, the speech recognizer 16 converts the speech into text data and provides the text data to the action evaluator 18 as text data "T".

When the rhythm recognizer 17 receives a speech from the microphone speech input unit 11, the rhythm recognizer 17 analyzes the speech, and detects the tone pitch, power and speed of the speech. After that, the rhythm recognizer 17 provides the action evaluator 18 with data PRO(t) {pitch(t), power(t), speed(t)} which indicates the rhythm at the time "t".

The action evaluator 18 calculates action evaluation values for respective modals of the user's action and an overall evaluation value by employing a calculation method using inter-weighed-data distances, which calculation method uses data provided from the respective recognizers and user action instructor data provided from the scenario controller 19 which serves as a model of the user's action. Here, the overall evaluation value is calculated using the action evaluation values of all the modals, which is used to comprehensively evaluate the user's action in order to determine ongoing of a story. After that, the action evaluator 18 provides the scenario controller 19 with the action evaluation value data and overall evaluation value data as action evaluation result data.

The method of calculating the action evaluation values for the respective modals at the time "t" by the action evaluator 18, which uses inter-weighed-data distances, is shown below.

The action evaluator 18 calculates an action evaluation value Fscore(t) at a given time "t" by employing formula (1) described below using data F(t) provided from the face recognizer 12 and user action instructor data Ft(t) provided from the scenario controller 19.

$$F\text{score}(t)=\Sigma\exp(-Wi|Fi-Fti|)/N \qquad (1)$$

Wherein i=0 to 4, and F0=x, F1=y, F2=roll, F3=pitch, F4=yow. Therefore, the number of data N is 5. Also Fti is user action instructor data for Fi, and Wi is a weighting coefficient of data.

Furthermore, the action evaluator 18 calculates an action evaluation value Gscore(t) by employing formula (2) described below using data G(t) provided from the visual line recognizer 13 and user action instructor data Gt(t) provided from the scenario controller 19.

$$G\text{score}(t)=\Sigma\exp(-Wi|Gi-Gti|)/N \qquad (2)$$

Wherein i=0 to 3, and G0=θr, G1=Φr, G2=θl, G3=Φl. Therefore, the number of data N is 4. Also Gti is user action instructor data for Gi, and Wi is a weighting coefficient of data.

Moreover, the action evaluator 18 calculates an action evaluation value Escore(t) by employing formula (3) described below using data E(t) provided from the expression recognizer 14 and user action instructor data Et(t) provided from the scenario controller 19.

$$E\text{score}(t)=\Sigma\exp(-Wi|Ei-Eti|)/N \qquad (3)$$

Wherein Ei is data showing an inter-feature-point distance, and i=0 to 15 as shown in FIG. 2. Therefore, the number of data N is 16. Also Eti is user action instructor data for Ei, and Wi is a weighting coefficient of data.

Also, the action evaluator 18 calculates an action evaluation value Hscore(t) by employing formula (4) described below using data H(t) provided from the hand gesture recognizer 15 and user action instructor data Ht(t) provided from the scenario controller 19.

$$H\text{score}(t)=\Sigma\exp(-Wi|Hi-Hti|)/N \qquad (4)$$

Wherein i=0 to 4, and H0=x, H1=y, H2=s, H3=α, H4=1. Therefore, the number of data N is 5. Also Hti is user action instructor data for Hi, and Wi is a weighting coefficient of data.

Also, the action evaluator 18 calculates an action evaluation value Tscore(t) by employing formula (5) described below using text data "T" provided from the speech recognizer 16 and user action instructor data "Tt" provided from the scenario controller 19.

$$T\text{score}(t)=\exp(-W^*\text{Levenshtein distance}) \qquad (5)$$

Wherein the Levenshtein distance is the minimum number of characters necessary for replacement, insertion, or deletion in order to convert the text data "T" provided from the speech recognizer 16 into the user action instructor data "Tt" provide from the scenario controller 19. "W" is a weighting coefficient of data.

And the action evaluator 18 calculates an action evaluation value PROscore (t) by employing formula (6) described below using data PRO(t) provided from the rhythm recognizer 17 and user action instructor data PRO(t) provided from the scenario controller 19.

$$PROscore(t) = \Sigma \exp(-Wi|PROi - PROti|)/N \quad (6)$$

Wherein i=0 to 2, and PRO0=pitch, PRO1=power, PRO2=speed. Therefore, the number of data N is 3. Also PROti is user action instructor data for PROi, and Wi is a weighting coefficient of data.

After that, the action evaluator 18 calculates an action evaluation value to be provided to the scenario controller 19 by using the action evaluation values at the time "t", obtained by the formulas (1) through (6) mentioned above.

Here, the action evaluator 18 defines the time period between the start and the end of an action evaluation as one scene, and defines the scene so that a speech recognition result fits into one scene, and calculates an action evaluation value which is to be provided to the scenario controller 19 every time one scene ends.

Specifically, for modals other than speech, the action evaluator 18 integrates the action evaluation value at the time "t" over the scene time. For a speech, the action evaluation value at the time "t" is averaged by the number of times by which data is input within one scene. The value, thus obtained, is defined as the action evaluation value to be provided to the scenario controller 19.

Moreover, the action evaluator 18 defines the average value of thus calculated action evaluation values of all the modals, or the weighed average value as the overall evaluation value.

After that, the action evaluator 18 provides the scenario controller 19 with data of the action evaluation values for the respective modals and data of the overall evaluation value as action evaluation result data.

The scenario controller 19 provides the action evaluator 18 with the user action instructor data when the action evaluator 18 evaluates an action.

The scenario controller 19 also has predetermined threshold values for the action evaluation values of the respective modals and for the overall evaluation value, and compares the action evaluation values with the threshold values and compares the overall evaluation value with the threshold value when the action evaluation result data is provided from the action evaluator 18.

In response to the comparison result, the scenario controller 19 provides the agent controller 20 with agent operation data which shows what kind of operation the agent 21 should do to the user, and also provides the action evaluator 18 with next user action instructor data.

When the agent operation data is provided from the scenario controller 19, the agent controller 20 controls the agent 21 based on the agent operation data.

When controlled by the agent controller 20, the agent 21 operates based on the agent operation data.

Next, the operation to evaluate a user's action by the action evaluation apparatus 1 of above-described configuration will be explained for two cases, or for the case of action practice mode and for the case of stage real play mode.

Figure 3:
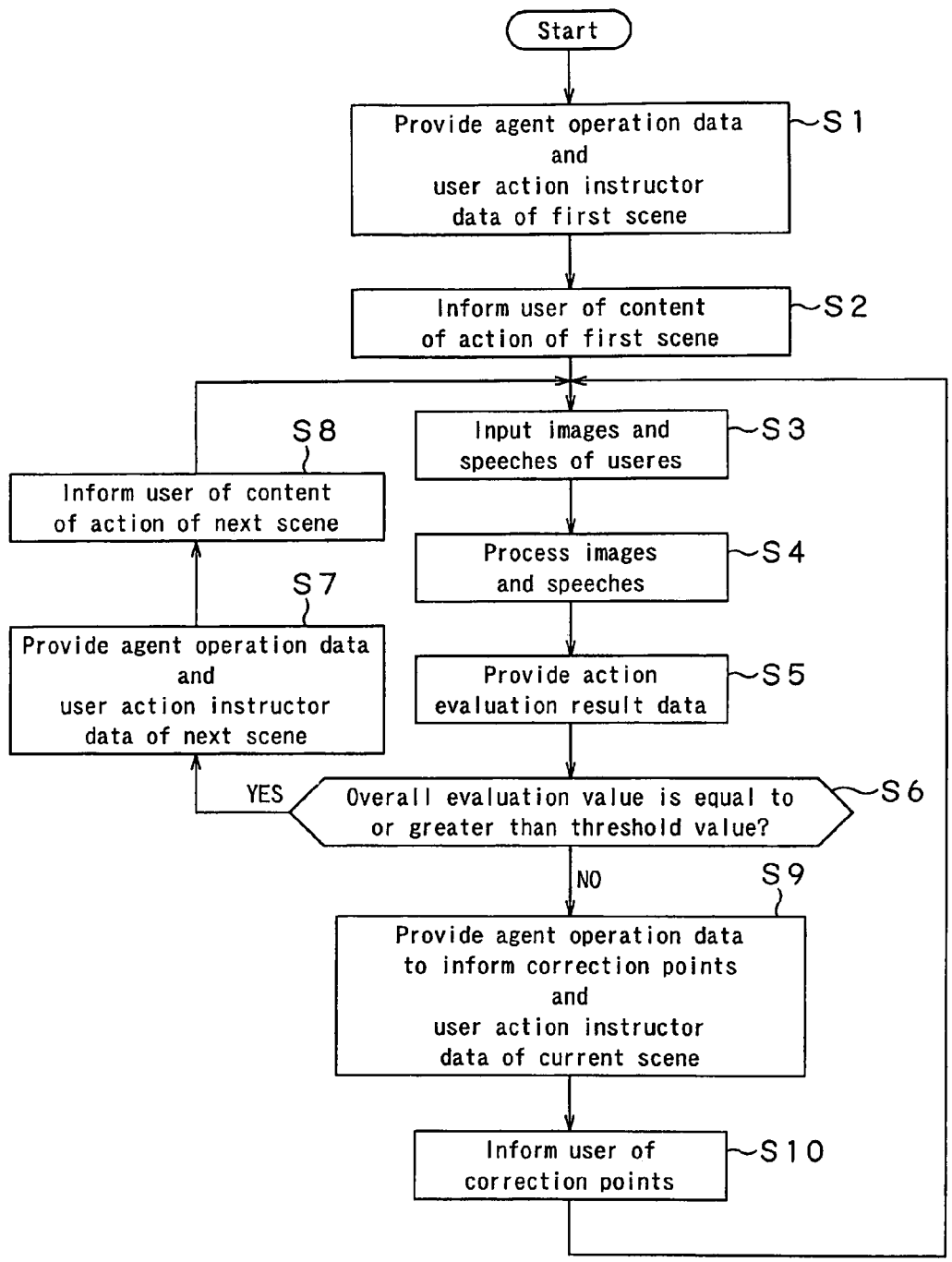
FIG. 3 shows a flow chart showing the operation sequence in action practice mode of the action evaluation apparatus.
Figure 4:
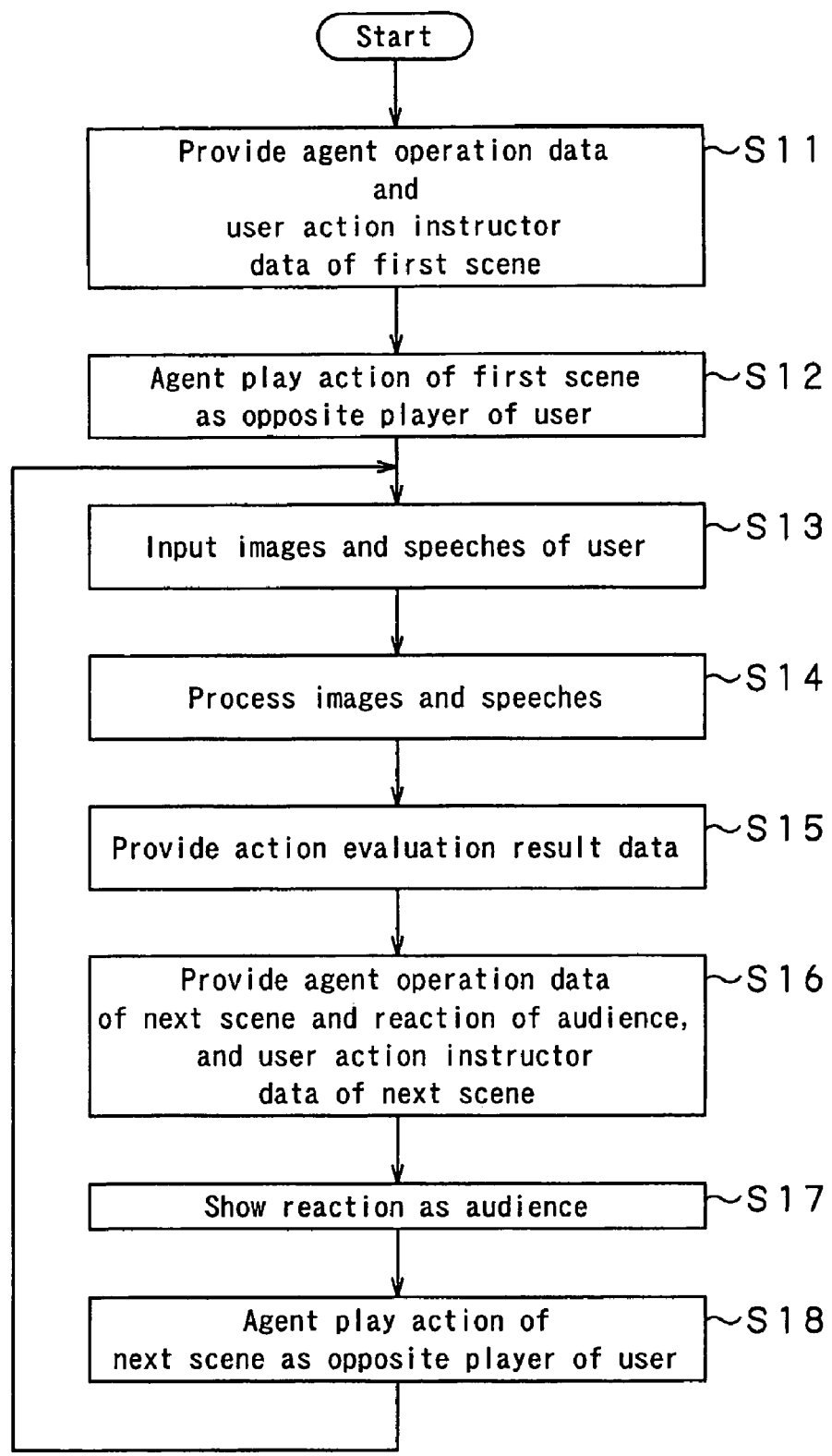
FIG. 4 shows a flow chart showing the operation sequence in stage real play mode of the action evaluation apparatus.

The operation of the action evaluation apparatus 1 to evaluate a user's action is carried out, for instance, according to flow charts shown in FIG. 3 and FIG. 4.

The operation of the action evaluation apparatus 1 in the action practice mode is shown in FIG. 3.

First, in step S1, the scenario controller 19 provides the agent controller 20 with agent operation data to inform the user of the content of the user's action in the first scene of a story. Also, the scenario controller 19 provides the action evaluator 18 with user action instructor data corresponding to the first scene of the story.

Next in step 2, under the control of the agent controller 20, the agent 21 informs the user of the content of an action of the first scene as a stage director.

In step S3, the camera image input unit 10 inputs images of the user's action instructed by the agent 21, and the microphone speech input unit 11 inputs speeches, providing thus input images and speeches to the respective recognizers mentioned above.

After that, in step S4, the respective recognizers process the images and speeches, and then provide the action evaluator 18 with the recognition result data of the respective modals.

In step S5, the action evaluator 18 calculates the user's action evaluation values using data provided from the respective recognizers and the user action instructor data provided from the scenario controller 19, and then provides the scenario controller 19 with the action evaluation value data and the overall evaluation value data as action evaluation result data.

In step S6, when the action evaluation result data is provided, the scenario controller 19 compares the action evaluation values with their threshold values, and compares the overall evaluation value with its threshold value. Here, in case the overall evaluation value is equal to or greater than the threshold value, the processing goes to step S7. On the other hand, in case the overall evaluation value is less than the threshold value, the processing goes to step S9.

In case the overall evaluation value is equal to or greater than the threshold value, in step S7, the scenario controller 19 provides the agent controller 20 with agent operation data to inform the user of the content of the user's action in the next scene. Also, the scenario controller 19 provides the action evaluator 18 with user action instructor data corresponding to the next scene.

In step S8, under the control of the agent controller 20, the agent 21 informs the user of the content of an action of the next scene as a stage director.

On the other hand, in case the overall evaluation value is less than the threshold value, in step 9, the scenario controller 19 provides the agent controller 20 with agent operation data to inform the user of correction points of the current action for the modals whose action evaluation values are less than their threshold values. And the scenario controller 19 once again provides the action evaluator 18 with user action instructor data corresponding to the current scene.

In the step S10, under the control of the agent controller 20, the agent 21 informs the user of correction points in the current action.

In this manner, in the action practice mode, it is determined whether the user plays an action of the next scene or plays the action of the current scene again depending on the comparison result between the overall evaluation value and the threshold value.

For example, in the action practice mode:

Agent A (stage director): "Well then, say the line "Oh Romeo, why are you Romeo?" as if you were looking up at the sky."

User: "(in front of the camera image input unit and the microphone speech input unit, as if he or she was looking up at the sky) Oh Romeo, why are you Romeo?"

Action evaluator: Fscore=0.9, Gscore=0.9, Escore=0.8, Hscore=0.8, Tscore=0.5, PROscore=0.3

Scenario controller: $Score_{Threshold}(80) > Score(70)$ Then Repeat

Agent A (stage director): "Your action score is 70 points. The expression and pose were fine but the way the line was expressed lacked something. Please do it again."

User: "(in front of the camera image input unit and the microphone speech input unit, as if he or she was looking up at the sky) Oh Romeo, why are you Romeo?"

Action evaluator: Fscore=0.9, Gscore=0.9, Escore=0.9, Hscore=0.9, Tscore=1, PROscore=0.9

Scenario controller: $Score_{Threshold}(80) < Score(92)$ Then Go To Next Agent A (stage director): "You did pretty well. You scored 92! So, let's go to the next scene."

In this manner, the story is made to go on in accordance with mutual operation between the action evaluation apparatus 1 and the user.

On the other hand, the operation of the action evaluation apparatus 1 in the stage real play mode is shown in FIG. 4.

First, in step S11, the scenario controller 19 provides the agent controller 20 with agent operation data to control the operation of the agent 21 in the first scene of a story. Also, the scenario controller 19 provides the action evaluator 18 with user action instructor data corresponding to the first scene of the story.

Next in step 12, under the control of the agent controller 20, the agent 21 plays an action of the first scene of the story as the opposite player of the user.

In step S13, when the user plays the action of the first scene in response to the action of the agent 21 as the opposite player of the user, the camera image input unit 10 inputs images of the user's action, and the microphone speech input unit 11 inputs speeches of the user's action, providing thus input images and speeches to the respective recognizers mentioned above.

After that, in step S14, the respective recognizers process the images and speeches, and then provide the action evaluator 18 with the recognition result data of the respective modals.

In step S15, the action evaluator 18 calculates the user's action evaluation values using data provided from the respective recognizers and the user action instructor data provided from the scenario controller 19, and then provides the scenario controller 19 with the action evaluation value data and the overall evaluation value data as action evaluation result data.

In step S16, the scenario controller 19 provides the agent controller 20 with agent operation data to control the operation of the agent 21 in the next scene and agent operation data to show reaction of an audience corresponding to the overall evaluation value to the user. The scenario controller 19 also provides the action evaluator 18 with user action instructor data corresponding to the next scene.

In step S17, the agent 21, which is controlled by the agent controller 20, shows reaction corresponding to the user's action of the current scene to the user as an audience.

In step S18, the agent 21, which is controlled by the agent controller 20, plays an action of the next scene as the opposite player of the user.

For instance, in the stage real play mode,

Agent A (Romeo): "If I breathe on this with my hand, please allow me to kiss for redemption since I am a blushful pilgrimage."

User (Juliet): (In front of the camera image input unit and the microphone speech input unit as if the user were looking shy) "Your faith devotion is very polite and classy. Even a saint has a hand. I allow a pilgrimage to touch. But kissing is not acceptable."

Action evaluator: Fscore=0.9, Gscore=0.9, Escore=0.9, Hscore=0.9, Tscore=1, PROscore=0.9

Scenario controller: $Score_{Threshold}(80) < Score(92)$ Then Go To Next

Agent B (audience): Big applause

In this manner, the story is made to go on in accordance with mutual operation between the action evaluation apparatus 1 and the user.

So far the configuration and operation of the action evaluation apparatus 1 has been explained, where the action evaluator 18 calculates action evaluation values using inter-weighed-data distances. However, as a method to calculate action evaluation values by the action evaluator 18, other than the one using the inter-weighed-data distances, there is known one using the Bayesian Network.

Figure 5:
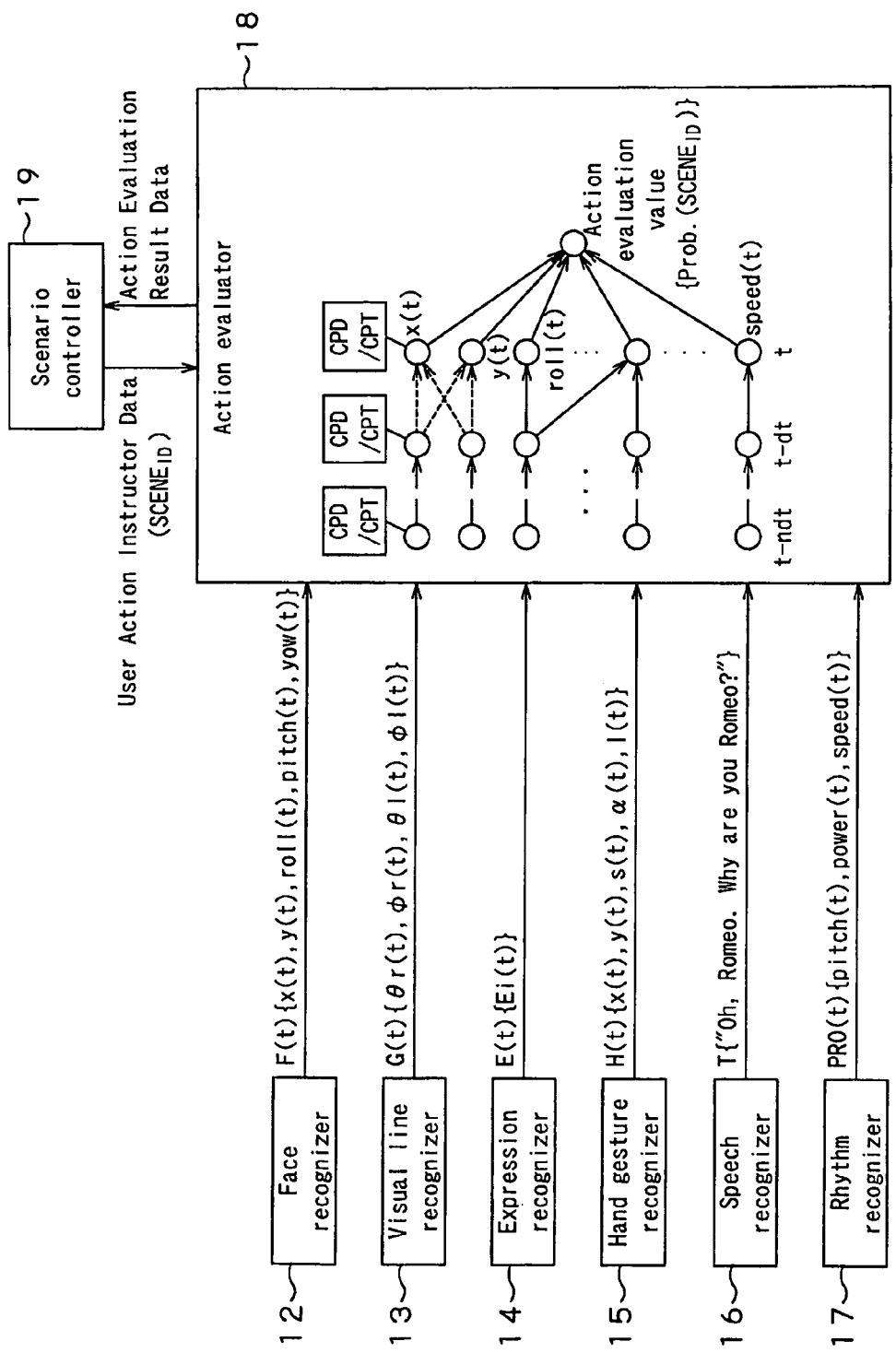
FIG. 5 shows an action evaluator using the Bayesian network.

FIG. 5 shows the configuration of the action evaluator 18 using the Bayesian Network.

Here in FIG. 5, the respective recognizers and the scenario controller 19 are also shown.

The action evaluator 18 is configured by nodes whose status variables are recognition results of the recognizers of the respective modals at each given time and nodes whose status variables are types of scene, and has the Bayesian Network configuration in which causal relations of the respective nodes are connected using directed graphs.

Here, each node has a conditional probability distribution (CPD) or a conditional probability table (CPT).

The Bayesian network configuration may be designed by a designer or obtained by a sample data through learning. The configuration of the latter case makes sample data by collecting time-series data of the respective recognizers when a user actually plays an action, being obtained using the K2 algorithm or MCMC method.

An action matching probability that shows how much the user's action matches the present scene is calculated in the way shown below by using the Bayesian Network.

First, the scenario controller 19 provides the action evaluator 18 with user action instructor data (SCENEID) which indicates an ID of the present scene.

After the recognizers of the respective modals process images and speeches, the recognizers, excluding the speech recognizer 16, provide their corresponding nodes with recognition result data at each time. And from the speech recognizer 16, recognition result data is provided to its corresponding nodes at the time when the recognition result data is provided.

Next, after the recognition result data of the respective recognizers at each time is provided to the respective nodes, the action evaluator 18 makes deductions using the $\pi$-$\lambda$ method, junction tree algorithm, Loopy BP method, etc., and calculates an action matching probability {Prob.(SCENEID)} as an evaluation value for an action in each scene.

After that, the action evaluator 18 provides the scenario controller 19 with action evaluation value data which is represented as the action matching probability as action evaluation result data.

The scenario controller 19 has a predetermined threshold value for the action evaluation value, and compares the action evaluation value with the threshold value when the action evaluation result data is provided from the action evaluator 18.

In response to the comparison result, the scenario controller 19 provides the agent controller 20 with agent operation data which shows what kind of operation the agent 21 should do to the user, and provides the action evaluator 18 with user action instructor data (SCENEID) which shows an ID of the present or next scene.

For instance, in the stage real play mode with the scene whose ID is 3 (ID=3):

Agent A (Romeo): "If I breathe on this with my hand, please allow me to kiss for redemption since I am a blushful pilgrimage."

User (Juliet): (In front of the camera image input unit and the microphone speech input unit as if the user were looking shy)"Your devotion is very polite and classy. Even a saint has a hand. I allow a pilgrimage to touch. But kissing is not acceptable."

Action evaluator: Prob. (SCENEID=3)=0.9

Scenario controller: $Prob_{Threshold} < Prob.(SCENE_{ID}=3)$ Then Go To Next

Agent B(audience): Big applause

In this manner, the story is made to go on in accordance with mutual operation between the action evaluation apparatus 1 and the user.

While the invention has been described in accordance with certain preferred embodiments, the invention is not limited to the embodiments, but various modifications can be implemented without departing from the scope and spirit of the present invention.

For example, the embodiments mentioned so far employ the method using inter-weighed-data distances and the method using the Bayesian network as method to calculate an action evaluation values by the action evaluator 18. However, it is possible to configure an action evaluation apparatus that combines an action evaluator using inter-weighed-data distances and another evaluator using the Bayesian Network. It is also possible to actually calculate inter-weighed-data distances using data provided from some of the recognizers, and provide the result to the Bayesian Network, thereby calculating an overall action evaluation value. It is also possible to provide data provided from some of the recognizers to the Bayesian Network, and calculate an overall evaluation value of action using inter-weighed-data distances obtained from the result.

Moreover, as modals which are used for the respective recognizers to recognize user's action, other than the modals mentioned above, for instance, movement of legs, shape of mouth, shape of eyes, shape of eye brows, and posture.

It should be understood by those skilled in the art that various modifications, combinations sub-combinations and alterations may occur depending on design requirements and other factors insofar as they are within the scope of the appended claims or the equivalents thereof.

What is claimed is:

1. An action evaluation apparatus for calculating a user's action evaluation values, comprising:
    recognition means for recognizing the user's action through a plurality of modals;
    calculating means for calculating the user's action evaluation values based on the recognition result of the associated modals obtained by the recognition means, wherein the calculating means calculates an overall evaluation value through each of the plurality of modals;
    determination means for determining if the overall evaluation value is less than a predetermined threshold value; and
    notification means for notifying the user of action correction points for modals whose action evaluation value is less than a predetermined threshold value when the overall evaluation value is less than the predetermined threshold value.

2. The action evaluation apparatus as set forth in claim 1, wherein the action evaluation means evaluates the user's action using instructor data for the respective modals.

3. The action evaluation apparatus as set forth in claim 2, wherein
    the recognition result data and the instructor data are expressed in the form of a vector, and
    the action evaluation means evaluates the user's action based on an inter-vector distance between the recognition result data and the instructor data.

4. The action evaluation apparatus as set forth in claim 1, wherein the action evaluation means calculates a matching probability of the user's action and a target action using the Bayesian Network, and evaluates the user's action based on the matching probability.

5. The action evaluation apparatus as set forth in claim 1, wherein the recognition means uses, as modals, at least two items of the face position and direction, visual line direction, face expression, movement of hands and legs, shape of mouth, shape of eyes, shape of eyebrows, posture, contents of speech, and rhythm.

6. An action evaluation method for calculating a user's action evaluation values, comprising the steps of:
    recognizing the user's action through a plurality of modals;
    calculating the user's action evaluation levels based on the recognition result of the associated modals obtained in the recognition steps, wherein an overall evaluation value is calculated through each of the plurality of modals;
    determining if the overall evaluation value is less than a predetermined threshold; and
    notifying the user of action correction points for modals whose action evaluation value is less than a predetermined threshold value when the overall evaluation value is less than a predetermined threshold value.

7. An action evaluation apparatus for calculating a user's action evaluation levels, comprising:
    a recognizer for recognizing the user's action through a plurality of modals; and
    an action calculator for calculating the user's action evaluation levels based on the recognition result of the associated modals obtained by the recognizer, wherein the action calculator calculates an overall evaluation value through each of the plurality of modals;
    a determiner for determining if the overall evaluation value is less than predetermined threshold value; and
    a notifier for notifying the user of action correction points for modals whose action evaluation value is less than a predetermined threshold value when the overall evaluation value is less than a predetermined threshold value.

* * * * *